United States Patent [19]

Cotton, Jr. et al.

[11] 4,193,780
[45] Mar. 18, 1980

[54] AIR FILTER CONSTRUCTION

[75] Inventors: Worth Cotton, Jr.; A. Reese Hunter, both of Greensboro, N.C.

[73] Assignee: Industrial Air, Inc., Greensboro, N.C.

[21] Appl. No.: 890,573

[22] Filed: Mar. 20, 1978

[51] Int. Cl.² .................. B01D 46/06; B01D 46/40
[52] U.S. Cl. ......................... 55/378; 55/380; 55/381; 55/483; 55/484; 55/499; 55/503; 55/509; 55/DIG. 12; 210/485; 210/493 R
[58] Field of Search ............... 55/373, 374, 378, 380, 55/497, 499, 500, 503, DIG. 12, 509, DIG. 26, 483, 484; 210/484, 485, 493 FR, 493 R

[56] References Cited

U.S. PATENT DOCUMENTS

| | | | |
|---|---|---|---|
| 2,211,382 | 8/1940 | Nutting | 55/521 |
| 3,026,967 | 3/1962 | Stevens et al. | 55/521 |
| 3,249,228 | 5/1966 | Arvanitakis | 55/DIG. 12 |
| 3,470,680 | 10/1969 | Avera | 55/509 |
| 3,486,626 | 12/1969 | Close | 210/232 |
| 3,606,736 | 9/1971 | Leliaert et al. | 55/302 |
| 3,691,736 | 9/1972 | Neumann | 55/509 |
| 3,716,970 | 2/1973 | Stupe et al. | 55/500 |
| 3,856,941 | 12/1974 | Dietrich | 55/500 |
| 3,871,851 | 3/1975 | Neumann | 55/500 |
| 3,941,571 | 3/1976 | Getzin | 55/500 |
| 3,984,221 | 10/1976 | Cotton, Jr. | 55/501 |

FOREIGN PATENT DOCUMENTS 1000457  8/1965 United Kingdom ............ 55/378

Primary Examiner—David L. Lacey

[57] ABSTRACT

A plurality of separate V-shaped wire mesh members are arranged and connected in side-by-side relationship to provide a plurality of V-shaped cells across an air stream. A W-shaped retainer or connector formed of perforated sheet metal has outer, downstream facing trackways which receive side edges of the wire mesh members, and a central, upstream facing trackway which receives and retains the free edges of V-shaped filter media bags which are inserted into the V-shaped cells overlying the wire mesh. A stabilizer bar extends across and attaches to the exposed adjoining edges of the V-cells to support the cells in proper relation and retain the filter media in place.

6 Claims, 4 Drawing Figures

AIR FILTER CONSTRUCTION

BACKGROUND OF THE INVENTION

In the construction of V-cell air filters a sheet of relatively heavy gauge, wire mesh or screen is folded in a V-shape or series of adjacent V-shapes to form a supporting frame with a plurality of such "cells" for supporting an overlying fibrous filter media. Most prior art filters of this type also include a rectangular metal frame to support the edges of the wire screen in position across the air flow conduit, and triangular sheet metal caps across the open tops and bottoms of the V-cells to close off and stabilize the upper and lower ends of the wire mesh frame. A filter cell of this type is generally illustrated and described in U.S. Pat. No. 3,984,221 although the claims of such patent are primarily directed to an improved retaining strip for the filter media of such filters.

Two significant problems have existed in the above-mentioned and other similar prior designs of V-cell filters. One problem is caused by the retainers and frame areas in prior devices, which are dead areas as far as the passage of air is concerned. In a high velocity system (approximately 1500 fpm) such "dead areas" become a limiting component by considerably increasing the size and capacity of the fan motors required to maintain the even flow of air therethrough. This increased fan size is required because in such prior systems the dead areas led to a pressure drop of 1.5 inches of mercury at air velocities of 1500 fpm. Consequently the increased horsepower requirements for the fan motors increase the energy requirements to operate the system, making the system significantly more expensive to purchase and maintain. This problem is more acute than may first seem, because fan motor size varies according to the cube of the ratio of pressure drops. For example doubling the pressure drop requires a fan motor increase of eight-fold.

A second problem in prior V-cell filters may also be attributed to the substantially dead or blocked areas, and the need to increase the effective areas of exposed filtering media through which air passes to maximize filter efficiency. The effective filter area is measured by the ratio of filter surface area to conduit cross-sectional area. Prior attempts at V-cell filters have been able to achieve such a ratio of only about 7.5 to 1. A prior attempt to locate a common solution to the undesirable high pressure drop and to the need for maximizing filter surface area resulted in the removal of considerable portions of the retainers and sheet metal frame surface in the cells, and replacing these areas with fibrous filter media. This solution utilized a plurality of cut wire mesh sections so connected as to form a substantially open V-cell wire mesh arrangement. The filter media was laid into the V-cell and clamps in the form of two plates bolted to the screen applied at the forward or upstream edges to hold the media in place.

The aforementioned approach was somewhat effective to significantly reduce the pressure drop and maximize effective filter area. However, while the improved V-cell design improved these two important problems, new problems in attaching the new filter media to the frame and in stabilizing the cell to decrease vibration and noise were created. The bag-like filter media was difficult for maintenance personnel to attach and therefore the bags were often incorrectly replaced resulting in poor filtration. Additionally, the excess time spent changing the bags significantly increased system down time.

It is to an improved means for connecting the separate wire mesh V-cells and for attaching filter media thereto that the present invention is directed.

SUMMARY OF THE INVENTION

The present invention is directed to the elimination of the above-discussed problems by providing an improved connecting element for joining the adjacent edges of the V-cells including a means for assembling the fibrous filter media thereto. The improved media connecting means is so fabricated as to engage the lateral upstream edges of adjacent wire mesh V-cells between spaced outer grooves or tracks and also to receive and retain in an intermediate groove or track the free side edges of adjacent fibrous filter bags inserted into adjoining cells.

The connecting element is fabricated from a thin strip of perforated sheet metal which is bent into a W-configuration having three elongated, vertically extending trackways, the central one preferably facing upstream and the outer ones preferably facing downstream. In use each of the outer trackways, receives one lateral edge of two adjacent wire mesh V-cells. The center trackway, which faces in the opposite or upstream direction, receives one side edge of each of the overlying filter media bags from the adjacent cells and retains the edges therein.

Each of the three trackways which comprise the media connecting element is a longitudinal extension including two sidewalls and an adjoining, rounded rear wall. The side walls of the center track and the inner wall of each outside track are common to each other and again, as stated above, the center trackway faces in a direction opposite to that of the outer tracks.

To erect the filter cell the prescribed number of V-shaped wire mesh cells are placed side by side, with the open ends all preferably facing upstream and the adjacent lateral edges in alignment. The connecting elements are emplaced by merely slipping one lateral edge of the V-cells into one of the outer trackways and securing it, and the corresponding edge of the adjacent V-cell into the other of the outer trackways and securing it. A filter media bag is then inserted inside each of the V-cells, tied in place at the rear or apex of the V, and the opposite side edges stretched around the outer walls of the connecting member and slipped into place in the center trackway. A simple blunt-edged tool such as a paperwheel may be used to slip the edge into the track where it will be held in place by friction. The top and bottom edges of the bag may be connected to the cover or base in any conventional manner.

A further means for holding the media edges in place, and for minimizing vibration of the frames during operation of the system is a horizontally mounted stabilizer bar. The stabilizer is mounted horizontally across the front of the upstream side of the filter cell by means of clips on the bar which snap into place over each of the assembled media connector elements.

The bar is positioned approximately along the center portion of the cell between the top and bottom and acts as a stabilizer against vibration and shifting of the individual V-cells. The aforementioned clips are welded or otherwise fastened to the bar at spaced intervals therealong corresponding to the widths of the V-cells. The clips will expand to slip over the connecting elements and the media and by means of a spring-like tension are held securely in place.

It is therefore an object of the present invention to provide an improved construction for V-cell filters having fibrous filter media bags mounted to an underlying open framework of wire mesh V-cells.

It is an object of the present invention to provide a V-cell filter frame and means for assembly thereof which will improve air flow through the filter cell.

It is a further object of the present invention to provide a connecting element for V-cell filters which joins adjacent wire mesh backing cells and the filter media thereto and permits the easy removal and replacement of the filter media during maintenance.

Still other and further objects and advantages will be apparent to those skilled in the art when the following detailed description is studied in conjunction with the accompanying drawings in which.

DETAILED DESCRIPTION OF A PREFERRED EMBODIMENT

Figure 1:
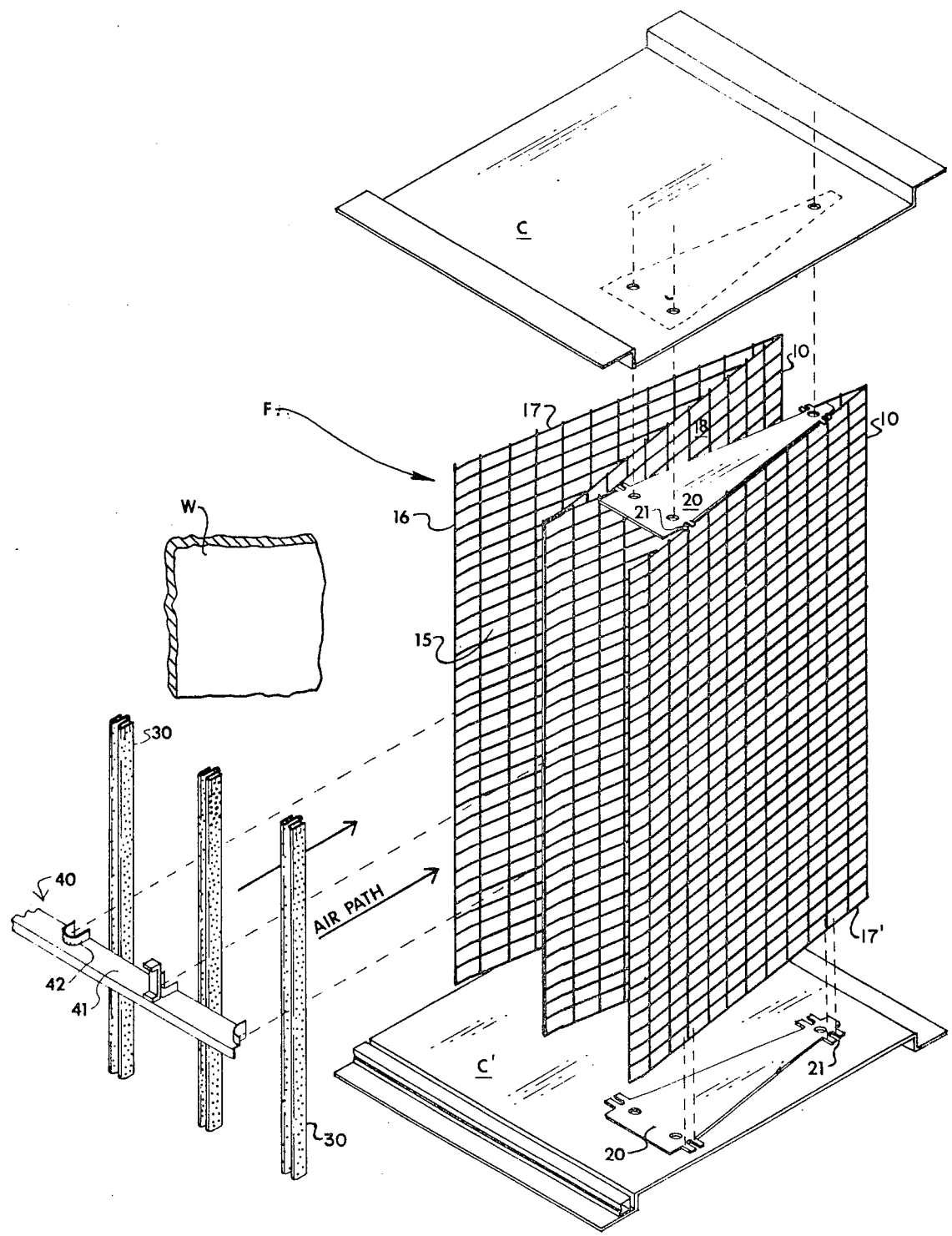
FIG. 1 is an exploded perspective view of a V-cell air filter with the filter media removed, but illustrating improvements to the frame according to the present invention.
Figure 4:
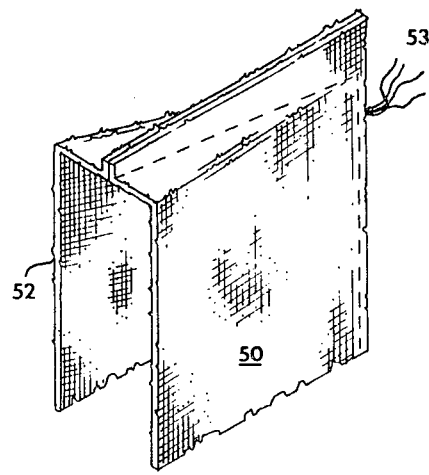
FIG. 4 is a partial perspective view of a bag-type filter as used with the present invention.

Turning to FIG. 1, a V-cell air filter unit F according to the present invention is illustrated and includes generally a plurality of V-shaped, wire mesh cells 10, top wall or frame cover C and bottom wall C', end cell caps or stiffeners 20, the unique media connecting element 30, and a stabilizer bar 40. The fibrous filter medium which is inserted into each cell and completes the working unit is not illustrated in this view. However, the preferred bag-type filter 50 is shown in FIG. 4.

In more detail, the components as shown, when assembled form a multiple, V-cell air filtering unit F of the type which is positioned within a walled conduit in the path of on-coming impure air stream to cleanse the air before it is recirculated or exhausted into the atmosphere. The top and bottom walls C,C' are sheet metal and are either connected to or representative of the walls of the air flow conduit within which the cell is placed. A portion of one side wall W is illustrated in FIG. 1, it being understood that a similar wall exists on the other side of the conduit even though not shown. The path of air flow is parallel to these walls C,C' moving in the direction of the arrows in FIG. 1.

Each section or cell 10 is generally made from a substantially rectangular piece of heavy gauge wire mesh or screening which is folded into a V-shape to form a chamber 15 with walls which converge in a downstream direction. A unit F may include two or more cells 15. In the illustrated embodiment two cells are shown for purposes of illustration, however, five or six cells is the more conventional situation.

After each section or cell 10 is formed, the cell end caps 20 are emplaced, primarily for stability. The caps 20 are fabricated from relatively thin sheet metal and are cut substantially in a triangular or truncated shape. They include a pair of tabs 21 on each side edge which are folded or bent around selected ones of the ribs on or near the top edges 17 and bottom edges 17' of the wire screening to cap the ends of the cells. The purpose of caps 20 is to stabilize and maintain the screen mesh in the V-formation. A cap 20, as illustrated, is preferably placed on each end 17,17' of the individual cell 15, but, if desired, a single, centrally located, similarly shaped support may suffice.

At this point the cells 10 are ready for positioning and emplacement of the unique connector elements 30 which join the adjacent edges of adjacent cells 10 and provide a retainer for the fibrous filter media bags shown in FIG. 4.

Figure 3:
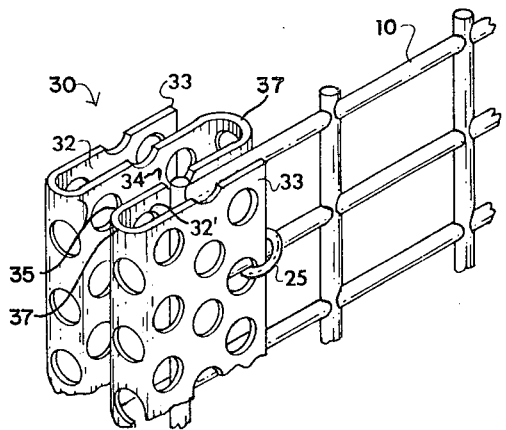
FIG. 3 is an enlarged perspective view, with portions cut away, of a preferred embodiment of the improved media connecting element.
Figure 2:
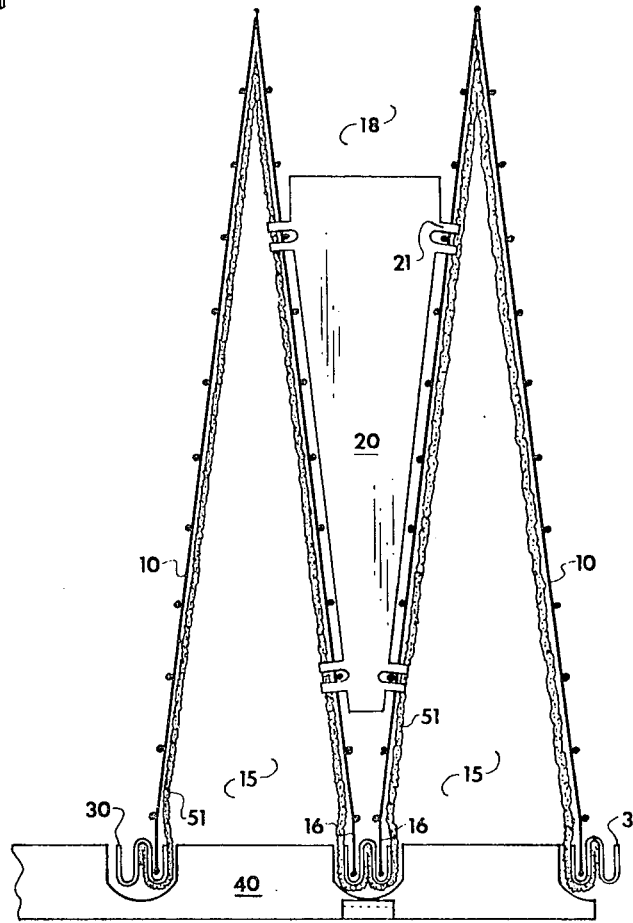
FIG. 2 is a plan view illustrating a V-cell filter, with cap or cover plate removed, according to the present invention.

The connector element 30 itself is more clearly illustrated in FIG. 3 while its relationship to other unit F components is best shown in FIG. 2. The W-or M-shaped element includes a pair of outer, downstream facing trackways 32,32', and an inner, upstream facing trackway 34 between the outer trackways 32,32'. Each of the trackways 32,32' are formd by an outer sidewall 33 and an inner sidewall 35. The inner track 34 is formed between adjacent inner walls 35. Each trackway 32,32' and 34 includes a rounded rear wall 37. The element 30 is actually formed by reverse bending a sheet of perforated metal at three points. Widthwise the outer tracks are preferably of such a width as to frictionally engage the wire mesh edges 16, while inner track 34 is of a width less than a double thickness of the filter media 50 causing the media to be compressed as it is inserted into trackway 34.

Looking at FIG. 2, one can see the element 30 is placed over and connects two adjacent cells by slipping one cell edge 16 into each of the outer tracks 32,32'. If the fit is not tight enough, connector elements 30 may be secured to the wire mesh by using ring shaped hooks 25 which pass through the mesh and a perforation, then are closed by pliers.

The filter media, preferably in the forms of bags 50, are placed into the cells, with the sides 51 of each bag wrapping around the outer sidewalls 33 of the connecting element 30 and being inserted into the inner trackway 34. Using a small blunt-edged tool or wheel the edges 52 are more easily pushed into and held in the track 34. The rear edge of each bag is then secured to the apex of the screen cell 10 in a conventional manner as by tying.

The stabilizer bar 40 is then snapped on to the unit F as shown in FIGS. 1 and 2. The horizontally mounted bar 40 illustrated in FIGS. 1 and 2 includes a bar portion 41 and a plurality of recesses 42 positioned at spaced intervals therealong to further support and secure the media to the connector elements 30. When the bar 40 is emplaced on the unit F the connecting elements 30 fit into recesses 42, and are held securely therein by a friction fit.

The stabilizer bar 40 in addition to helping maintain the filter media edges in place, stabilizes the frames 10 to decrease vibration and rattle when the system is operating. It should be noted that the bar 40 is of such slender, elongated design that, when placed in the path of air at the front of Unit F, it does not impede the flow of air therethrough.

From the above description it is apparent that an entire unit F may be constructed without the use of rivets and/or screws. It is particularly important that the connecting element 30 and stabilizer 40 may be merely slipped into frictional engagement with the V-cells 10 and with each other. Therefore maintenance personnel may easily remove those components and quickly replace the filter media bag 50. The bag 50 includes a tie 53 along the rear seam which is tied to the wire mesh at the apex of the cell. System down time is significantly reduced.

While a preferred embodiment has been discussed herein it should be understood that changes and alterations may be made without affecting the scope of the invention as claimed below.

What is claimed is:

1. An improved V-cell filter construction for emplacement within a walled conduit through which a contaminated air stream passes and comprising:
    (a) a plurality of separate, V-shaped wire mesh members arranged in side-by-side relationship presenting a plurality of V-shaped cells extending across said walled conduit in the path of said air stream, each of said wire mesh members having lateral edges thereof positioned on the upstream side of said filter construction;
    (b) a connecting means for engaging and holding in position the corresponding lateral edges of adjacent wire mesh members, said connecting means including a pair of spaced, outer trackways into which said lateral edges extend and means for retaining said lateral edges therein;
    (c) a plurality of separate, fibrous, filter media members folded into a generally V-shape and of a size, shape, and number generally corresponding to the size, shape and number of said V-cells, one of said filter media members inserted into each of said cells;
    (d) said connecting means further including a central trackway opening in the opposite direction from said outer trackways and of a width less than the combined thickness of two of said filter media members; and
    (e) the lateral edges of each of said filter media members extending around the sides of said connecting means and into said central trackway and retained therein.

2. The filter construction according to claim 1 wherein said connector means comprises a relatively thin gauge metal sheet bent into a W-shaped configuration forming said outer trackways and said central trackway.

3. The filter construction according to claim 2 wherein said thin gauge metal sheet includes a multiplicity of perforations therein.

4. The filter construction according to claim 3 wherein said retaining means comprises a plurality of ring shaped hooks which pass through corresponding openings in the mesh and perforated metal sheet.

5. The filter construction according to claim 1 wherein said filter media members comprise bags having a rectangular front opening, a closed rear edge, and side walls converging from said front opening to said closed rear edge, said rear edge being attached to the apex of the V-shaped mesh member into which it is inserted, and the front, free edges of said side walls being inserted into corresponding ones of said central trackways.

6. The filter construction according to claim 1 and further including a stabilizer bar having a plurality of recesses extending into one edge thereof at spaced positions therealong, said recesses corresponding in number, size and spacing to the adjacent side edges of said V-shaped cells, whereby said stabilizer bar surrounds the edges of said wire mesh members around the filter media and said connecting means in supporting relation thereto.

* * * * *